United States Patent
Oishi

(10) Patent No.: US 8,938,005 B2
(45) Date of Patent: Jan. 20, 2015

(54) IMAGE ENCODING APPARATUS, METHOD OF CONTROLLING THE SAME, AND COMPUTER PROGRAM

(75) Inventor: Akihiro Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1512 days.

(21) Appl. No.: 12/262,850

(22) Filed: Oct. 31, 2008

(65) Prior Publication Data

US 2009/0116555 A1    May 7, 2009

(30) Foreign Application Priority Data

Nov. 5, 2007  (JP) .................................. 2007-287852
Nov. 5, 2007  (JP) .................................. 2007-287853

(51) Int. Cl.
| | |
|---|---|
| *H04N 7/12* | (2006.01) |
| *H04N 11/02* | (2006.01) |
| *H04N 11/04* | (2006.01) |
| *H04N 19/527* | (2014.01) |
| *H04N 19/139* | (2014.01) |
| *H04N 19/152* | (2014.01) |

(Continued)

(52) U.S. Cl.
CPC ... *H04N 19/00593* (2013.01); *H04N 19/00151* (2013.01); *H04N 19/00193* (2013.01); *H04N 19/00266* (2013.01); *H04N 19/00175* (2013.01); *H04N 19/00781* (2013.01); *H04N 19/0009* (2013.01); *H04N 19/00187* (2013.01)
USPC ............ 375/240.16; 375/240.01; 375/240.03; 375/240.18; 375/240.22

(58) Field of Classification Search
USPC ............. 375/240.01, 240.03, 240.16, 240.18, 375/240.22
See application file for complete search history.

(56) References Cited

U.S. PATENT DOCUMENTS 5,835,138 A * 11/1998 Kondo ....................... 348/207.99
7,515,638 B2 * 4/2009 Le Meur et al. ......... 375/240.27

(Continued)

FOREIGN PATENT DOCUMENTS

| JP | 02-219388 | 8/1990 |
|---|---|---|
| JP | 03-124143 A | 5/1991 |

(Continued)

OTHER PUBLICATIONS

Arnold, John F et al. "Efficient drift-free signal-to-noise ratio scalability." Circuits and Systems for Video Technology, IEEE Transactions on 10.1 (2000): 70-82.*

(Continued)

*Primary Examiner* — Luu Pham
*Assistant Examiner* — Kari Schmidt
(74) *Attorney, Agent, or Firm* — Cowan, Liebowitz & Latman, P.C.

(57) ABSTRACT

An image encoding apparatus which encodes picture data is provided. The apparatus comprises an encoding unit configured to encode a picture to be encoded; a decoding unit configured to decode the encoded picture; an SN ratio calculation unit configured to calculate an SN ratio using the picture to be encoded and a decoding result of the decoding unit; a setting unit configured to set a target SN ratio serving as an index of the SN ratio; a bitrate control unit configured to control a bitrate of the picture to be encoded based on the target SN ratio; and a motion detection unit configured to detect motion information between the picture to be encoded and another picture, wherein the bitrate control unit controls the bitrate based on the motion information, and a difference between the SN ratio and the target SN ratio.

10 Claims, 7 Drawing Sheets

(51) Int. Cl.
*H04N 19/172* (2014.01)
*H04N 19/147* (2014.01)
*H04N 19/61* (2014.01)
*H04N 19/124* (2014.01)
*H04N 19/15* (2014.01)

(56) References Cited

U.S. PATENT DOCUMENTS

| | | | |
|---|---|---|---|
| 7,714,751 B2 * | 5/2010 | Hasegawa et al. | 341/61 |
| 2002/0085768 A1 * | 7/2002 | Yokose et al. | 382/248 |
| 2005/0089092 A1 * | 4/2005 | Hashimoto et al. | 375/240.03 |
| 2005/0201460 A1 * | 9/2005 | Kang et al. | 375/240.03 |
| 2005/0276328 A1 | 12/2005 | Sakamoto | |

FOREIGN PATENT DOCUMENTS

| | | |
|---|---|---|
| JP | 08-070458 | 3/1996 |
| JP | 09-065200 A | 3/1997 |
| JP | 09-191458 A | 7/1997 |
| JP | 10-013249 A | 1/1998 |
| JP | 2005-269428 A | 9/2005 |
| JP | 2005-354528 | 12/2005 |
| WO | 2006-099082 A2 | 9/2006 |

OTHER PUBLICATIONS

Paris, Sylvain, et al. "A gentle introduction to bilateral filtering and its applications." ACM SIGGRAPH 2007 courses. ACM, 2007: 1-45.*
Sep. 2, 2011 Japanese Office Action, that issued in Japanese Patent Application No. 2007-287852.
Jul. 19, 2013 Japanese Office Action, that issued in Japanese Patent Application No. 2012-116979.

* cited by examiner

FIG. 2

| INPUT | #1 | #2 | #3 | #4 | #5 | #6 | |

| OUTPUT | #3 | #1 | #2 | #6 | #4 | #5 | |

IMAGE ENCODING APPARATUS, METHOD OF CONTROLLING THE SAME, AND COMPUTER PROGRAM

BACKGROUND OF THE INVENTION

1. Field of the Invention

The present invention relates to an image encoding apparatus, a method of controlling the same, and a computer program.

2. Description of the Related Art

With the recent expansion of multimedia, various moving image compression encoding methods have been proposed. Typical examples are MPEG (Moving Pictures of Experts Group)-1, 2, and 4, and H.264. In the compression encoding process, an original picture (picture) contained in a moving image is divided into predetermined regions called blocks, and motion compensation/prediction and DCT (Discrete Cosine Transform) transform are executed for each of the divided blocks. For motion compensation/prediction, a reference picture is obtained by locally decoding already encoded picture data. For this reason, a decoding process is necessary even in encoding.

When a picture is compressed and encoded in conformance to MPEG, the code amount often largely changes depending on the spatial frequency characteristic that is the chracteristic of a picture itself, a scene, and a quantization scale value. An important technique that allows obtaining a high-quality decoded picture upon implementing an encoding apparatus having such encoding characteristics is code amount control.

As one of code amount control algorithms, TM5 (Test Model 5) is generally used. The TM5 code amount control algorithm includes three steps to be described below. The amount of code is controlled in the following three steps to ensure a constant bitrate in each GOP (Group Of Pictures).

(Step 1)

The target code amount of a picture to be encoded next is determined. An available code amount Rgop in the current GOP is calculated by $$Rgop=(ni+np+nb)*(bits\_rate/picture\_rate) \quad (1)$$

where ni, np, and nb are the numbers of remaining I-, P-, and B-pictures in the current GOP respectively, bits_rate is the target bit rate, and picture_rate is the picture rate.

Complexities Xi, Xp, and Xb of the I-, P-, and B-pictures are obtained based on the encoding results by $$Xi=Ri*Qi$$

$$Xp=Rp*Qp$$

$$Xb=Rb*Qb \quad (2)$$

where Ri, Rp, and Rb are amounts of code obtained by encoding the I-, P-, and B-pictures respectively, and Qi, Qp, and Qb are the average values of the Q-scale in all macroblocks in the I-, P-, and B-pictures respectively. Based on equations (1) and (2), target amounts Ti, Tp, and Tb of code of the I-, P-, and B-pictures respectively are obtained by $$Ti=\max\{(Rgop/(1+((Np*Xp)/(Xi*Kp))+((Nb*Xb)/(Xi*Kb)))), (bit\_rate/(8*picture\_rate))\}$$

$$Tp=\max\{(Rgop/(Np+(Nb*Kp*Xb)/(Kb*Xp))), (bit\_rate/(8*picture\_rate))\}$$

$$Tb=\max\{(Rgop/(Nb+(Np*Kb*Xp)/(Kp*Xb))), (bit\_rate/(8*picture\_rate))\} \quad (3)$$

where Np and Nb are the numbers of remaining P- and B-pictures in the current GOP respectively, and constants Kp=1.0 and Kb=1.4.

(Step 2)

Three virtual buffers are used for the I-, P-, and B-pictures, respectively, to manage the differences between the target code amounts obtained by equations (3) and the amounts of generated code. The data accumulation amount of each virtual buffer is fed back, and the Q-scale reference value is set based on the data accumulation amount for a macroblock to be encoded next so that the actual amount of generated code becomes closer to the target code amount. For example, if the current picture type is P-picture, the difference between the target code amount and the amount of generated code can be obtained by an arithmetic process based on $$dp,j=dp,0+Bp,j-1-((Tp*(j-1))/MB\_cnt) \quad (4)$$

where the suffix j is the macroblock number in the picture, dp,0 is the initial fullness of the virtual buffer, Bp,j is the total code amount up to the jth macroblock, and MB_cnt is the number of macroblocks in the picture.

The Q-scale reference value in the jth macroblock is obtained using dp,j (to be referred to as "dj" hereinafter) by $$Qj=(dj*31)/r \quad (5)$$

$$\text{for } r=2*bits\_rate/picture\_rate \quad (6)$$

(Step 3)

A process of finally deciding the quantization scale based on the spatial activity of the encoding target macroblock to obtain a satisfactory visual characteristic, that is, a high decoded picture quality is executed.

$$ACTj=1+\min(vblk1, vblk2, \ldots, vblk8) \quad (7)$$

where vblk1 to vblk4 are spatial activities in 8×8 subblocks in a macroblock with a frame structure, and vblk5 to vblk8 are spatial activities of 8×8 subblocks in a macroblock with a field structure. The spatial activity can be calculated by $$vblk=\Sigma(Pi-Pbar)^2 \quad (8)$$

$$Pbar=(1/64)*\Sigma Pi \quad (9)$$

where Pi is the pixel value in the ith macroblock, and $\Sigma$ in equations (8) and (9) indicates operations for i=1 to 64. ACTj obtained by equation (7) is normalized by $$N\_ACTj=(2*ACTj+AVG\_ACT)/(ACTj+AVG\_ACT) \quad (10)$$

where AVG_ACT is a reference value of ACTj in the previously encoded picture, and the quantization scale (Q-scale value) MQUANTj is finally calculated by $$MQUANTj=Qj*N\_ACTj \quad (11)$$

According to the above-described TM5 algorithm, the process in STEP 1 assigns a large code amount to I-picture. A large code amount is allocated to a flat region (with low spatial activity) where degradation is visually noticeable in the picture.

As an encoding method to which TM5 is applied, there is proposed a method of determining a target code amount so that the SN ratio of a picture signal and locally decoded picture takes a constant value (see Japanese Patent Laid-Open No. 02-219388). The proposed method can stabilize the quality of all pictures by setting a target code amount which keeps the SN ratio constant.

As an improvement of the proposed method, a method of setting the code amounts of I-, P-, and B-pictures to optimum values is proposed (see Japanese Patent Laid-Open No. 08-070458). According to this improved method, it is controlled to allocate the code amounts of respective frames (I-, P-, and B-pictures) so that the SN ratio of I-picture becomes higher than that of B-picture. That is, the code amounts of respective frames (I-, P-, and B-pictures) are controlled to set the encoding error of I-picture smaller than that of B-picture. This can improve the quality of I-picture serving as the main picture of the GOP.

An encoding method using the difference between frames is also proposed (see Japanese Patent Laid-Open No. 2005-354528). According to the proposed method, a global vector (GV) serving as the motion vector between a global current picture and a global reference picture is obtained. The macroblocks of the current picture are searched within a search region determined based on the GV reliability, detecting a motion vector. According to this method, the correlation between frames is obtained as a reliable value GRV, and the position of the search window in motion search is determined based on the reliable value GRV.

The method proposed in Japanese Patent Laid-Open No. 02-219388 can maintain a certain picture quality by keeping the SN ratio constant between pictures. The method proposed in Japanese Patent Laid-Open No. 08-070458 can also maintain a certain picture quality by considering the SN ratio and the code allocation of each picture.

However, these methods use the SN ratio as information for determining a target code amount, and do not fully consider the degree of quantitative degradation of the picture quality and the human visual characteristic. The SN ratio and picture quality may not always be proportional to each other.

For example, the SN ratio hardly greatly decreases even upon degradation of the picture quality in a picture formed from signals containing few high-frequency components in high-speed panning. However, visually conspicuous noise is readily generated in such a picture. As for a static picture, noise stands out even at the same SN ratio as that of other pictures because the picture does not move. Thus, the quality of the static picture cannot be regarded to be equal to that of other pictures. Hence, the proposed methods can neither keep the SN ratio constant to determine a target code amount, nor set a code amount which matches the human visual characteristic.

In this way, the proposed methods cannot set a code amount which matches the human visual characteristic, failing to obtain a high-quality decoded picture.

The proposed methods determine the code amount using not a picture before encoding but a picture after encoding. Consider a case in which an abrupt change occurs in a picture in which high-frequency components greatly increase upon the stop of a camera from a picture containing few high-frequency components in camera panning or the like, or a picture in which some object appears in the frame. In this case, the SN ratio greatly decreases upon encoding, and noise such as block noise readily occurs. Even if one tries to keep the SN ratio constant and determine a target code amount, it is difficult to determine an optimum code amount which does not generate noise. When the picture changes, the proposed methods cannot set an optimum code amount, which does not generate noise, so as to obtain a high-quality decoded picture.

SUMMARY OF THE INVENTION

The present invention can obtain a high-quality decoded picture by setting a code amount which matches the human visual characteristic. The present invention can also obtain a high-quality decoded picture by, when the picture changes, setting an optimum code amount which does not generate noise.

According to one aspect of the present invention, an image encoding apparatus which encodes picture data, the apparatus comprises: an encoding unit configured to encode a picture to be encoded by orthogonally transforming and quantizing the picture; a decoding unit configured to decode the encoded picture by inverse-quantizing and inverse-orthogonally transforming the encoded picture; an SN ratio calculation unit configured to calculate an SN ratio using the picture to be encoded and a decoding result of the decoding unit; a setting unit configured to set a target SN ratio serving as an index of the SN ratio; a bitrate control unit configured to control a bitrate of the picture to be encoded by the encoding unit by controlling the quantization process based on the target SN ratio; and a motion detection unit configured to detect motion information between the picture to be encoded and another picture, wherein the bitrate control unit controls the bitrate based on the motion information, and a difference between the SN ratio calculated by the SN ratio calculation unit and the target SN ratio set by the setting unit.

According to another aspect of the present invention, an image encoding apparatus which encodes picture data, the apparatus comprises: an encoding unit configured to encode a picture to be encoded by orthogonally transforming and quantizing the picture; a decoding unit configured to decode the encoded picture by inverse-quantizing and inverse-orthogonally transforming the encoded picture; an SN ratio calculation unit configured to calculate an SN ratio using the picture to be encoded and a decoding result of the decoding unit; a setting unit configured to set a target SN ratio serving as an index of the SN ratio; a bitrate control unit configured to control a bitrate of the picture to be encoded by the encoding unit by controlling the quantization process based on the target SN ratio; and a global vector calculation unit configured to calculate a global vector serving as a motion vector between the picture to be encoded and the picture immediately preceding to the picture to be encoded, and obtain a global vector reliable value (GRV) representing a correlation between the pictures, wherein the bitrate control unit controls the bitrate based on at least either of a difference between the SN ratio calculated by the SN ratio calculation unit and the target SN ratio set by the setting unit, and a ratio of a global vector reliable value of the picture to be encoded and a global vector reliable value of the immediately preceding picture.

Further features of the present invention will become apparent from the following description of exemplary embodiments with reference to the attached drawings.

BRIEF DESCRIPTION OF THE DRAWINGS

FIG. 2 is a view showing an example of picture rearrangement according to the embodiment of the present invention;

DESCRIPTION OF THE EMBODIMENTS

Preferred embodiments of the present invention will be described below with reference to the accompanying drawings.

[First Embodiment]

Figure 1:
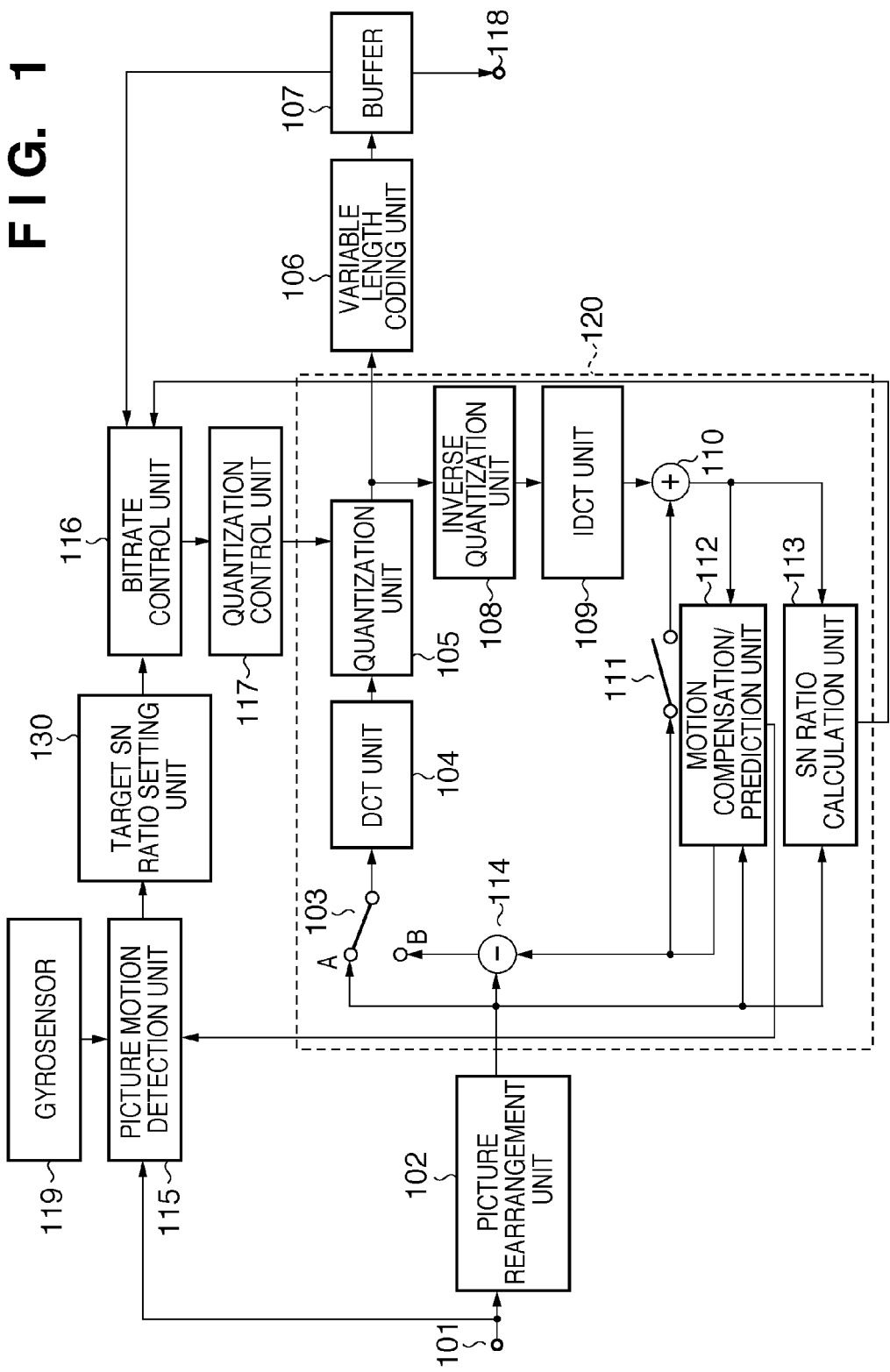
FIG. 1 is a block diagram showing an example of the arrangement of an encoding apparatus which implements an encoding method according to an embodiment of the present invention.
Figure 2:
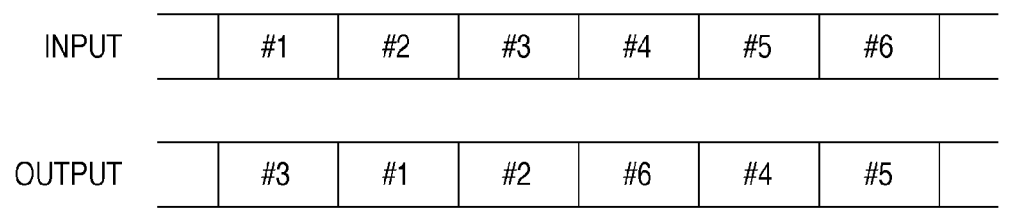
Figure 3:
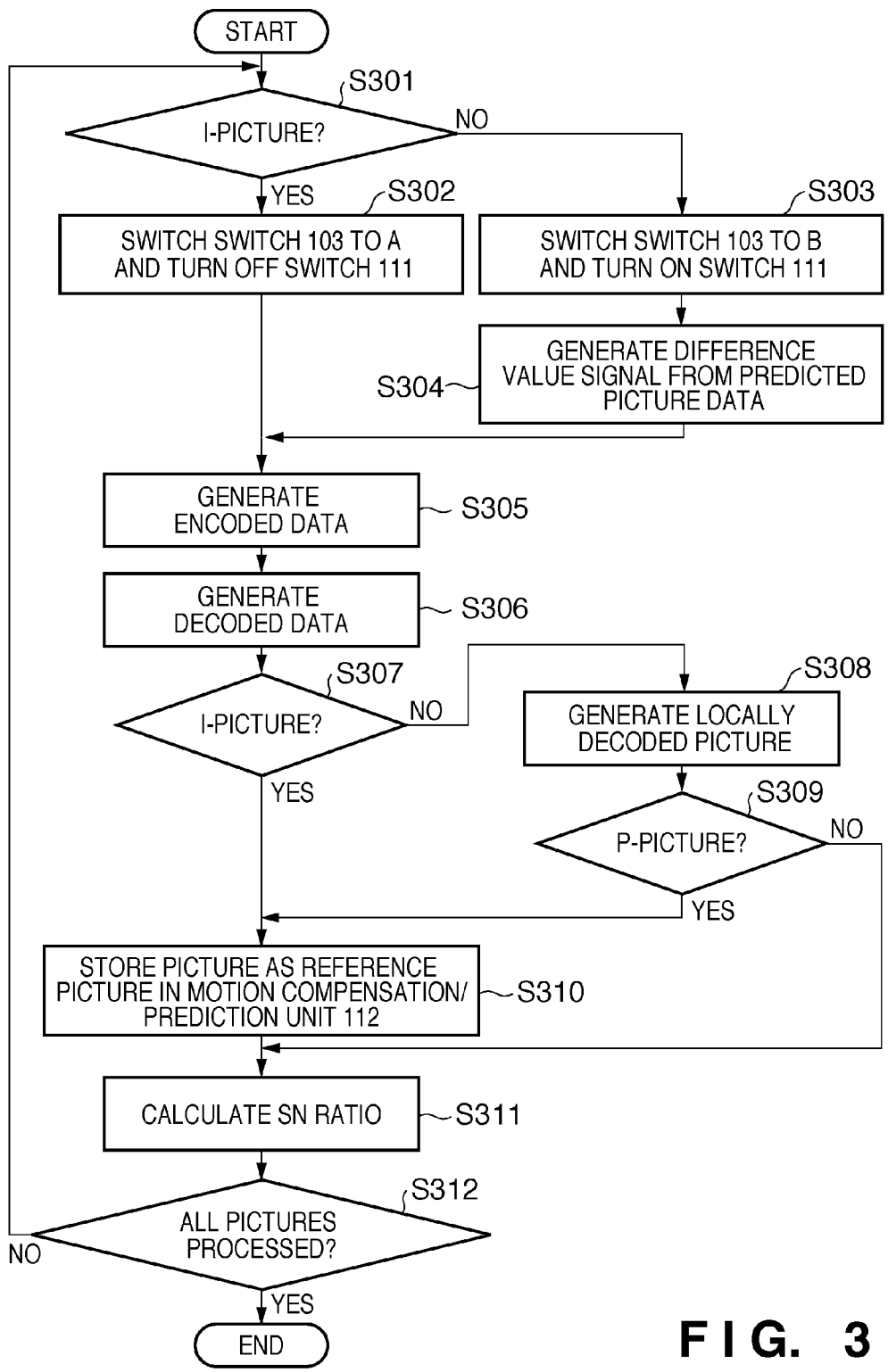
FIG. 3 is a flowchart showing an example of a process executed by processing units included in a dotted line area 120 in the encoding apparatus of FIG. 1 according to the embodiment of the present invention.
Figure 4:
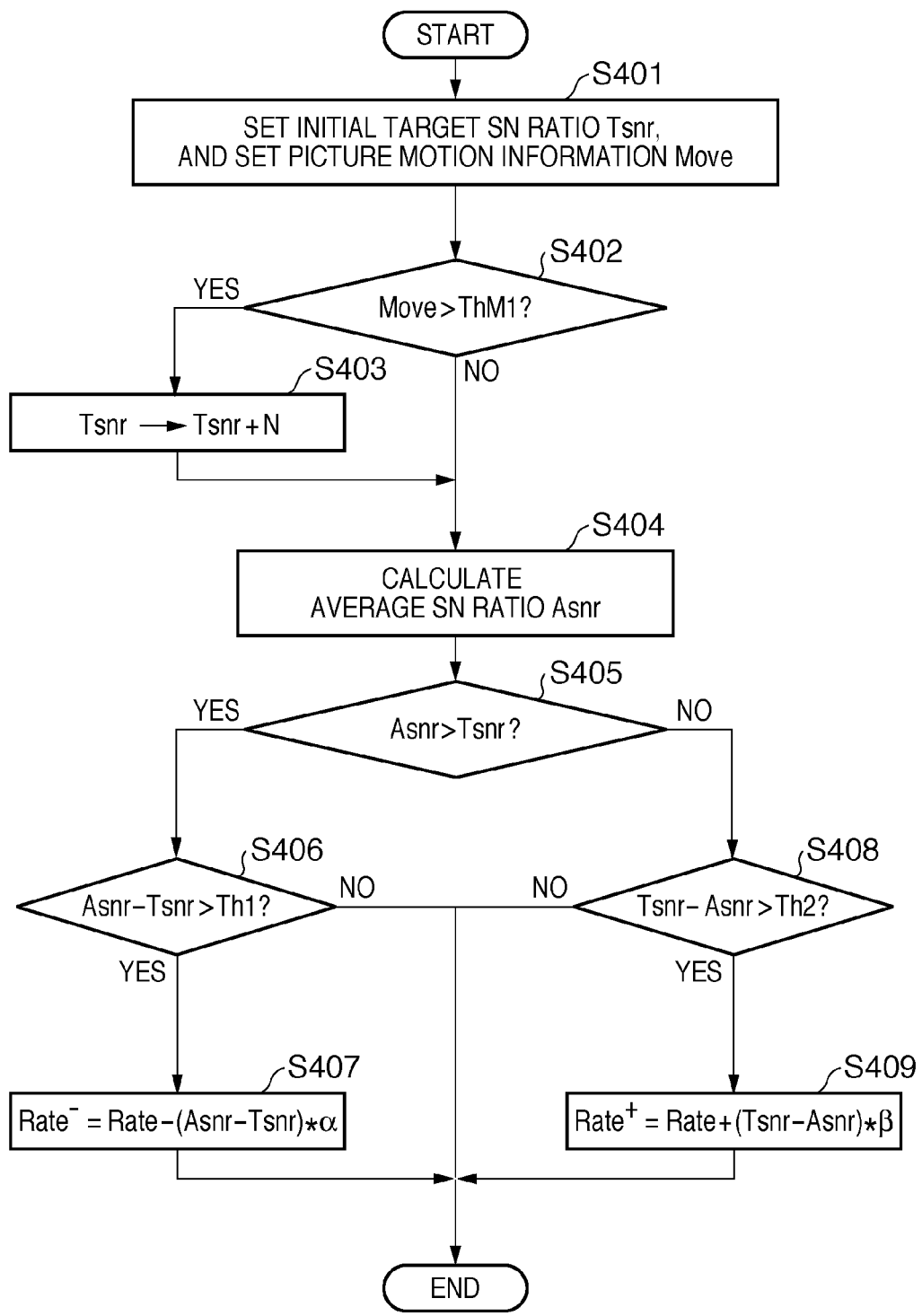
FIG. 4 is a flowchart showing an example of a process to determine a target bitrate according to the first embodiment of the present invention.

The first embodiment of the present invention will be described with reference to FIGS. 1 to 4. FIG. 1 is a block diagram showing an example of the arrangement of an encoding apparatus which implements an encoding method according to the embodiment of the present invention. The encoding method is, for example, MPEG or H.264/AVC (Advanced Video Coding). The encoding apparatus can be implemented as a video and audio signal recording apparatus such as a digital video camera. FIG. 2 is a view showing an example of picture rearrangement. FIG. 3 is a flowchart showing an example of a process executed by processing units included in a dotted line area 120 in the encoding apparatus of FIG. 1. FIG. 4 is a flowchart showing an example of a bitrate control process according to the embodiment of the present invention.

In FIG. 1, an input signal 101 to the encoding apparatus is, for example, a video signal from the image sensor (e.g., a CCD or CMOS) of the encoding apparatus or a video signal from a line input terminal. The input signal 101 is input divided into predetermined blocks. For example, MPEG adopts 16×16 or 8×8 blocks. The size is determined by the encoding method. In this specification, the block will be referred to as a "macroblock" hereinafter.

A picture rearrangement unit 102 is a processing unit which rearranges the order of input pictures and outputs the rearranged pictures to a processing unit on the output side. The picture rearrangement unit 102 incorporates a memory, and manages it so that pictures input in the order of #1, #2, #3, . . . are output in the order of #3, #1, #2, . . . , as shown in FIG. 2.

A switch 103 switches between an output from the picture rearrangement unit 102 and that from a subtracter 114 in accordance with the type of picture to be encoded. A DCT unit 104 is a processing unit which performs orthogonal transform (DCT). A quantization unit 105 is a processing unit which quantizes an orthogonally transformed output coefficient output from the DCT unit 104. A variable length coding unit 106 is a processing unit which performs a variable length coding process for a quantization result output from the quantization unit 105.

A buffer 107 temporarily saves encoded data output from the variable length coding unit 106, and outputs it to an output terminal 118. The buffer 107 outputs information representing the amount of generated code to a bitrate control unit 116 based on the buffer occupancy and the like. An inverse quantization unit 108 is a processing unit which inverse-quantizes the quantization result of the quantization unit 105. An IDCT unit 109 is a processing unit which performs inverse-orthogonal transform (IDCT) for the inverse-quantization result. An adder 110 is an arithmetic unit which adds decoded data obtained as the decoding result of inverse-orthogonal transform, and predicted picture data output from a motion compensation/prediction unit 112, outputting a locally decoded picture.

A switch 111 supplies predicted picture data from the motion compensation/prediction unit 112 to the adder 110 in accordance with the type of picture to be encoded. The motion compensation/prediction unit 112 is a processing unit which generates predicted picture data by performing motion compensation/prediction based on an output from the picture rearrangement unit 102 and that from the adder 110. An SN ratio calculation unit 113 is a processing unit which calculates the SN ratio using an output from the adder 110 and that from the picture rearrangement unit 102.

The subtracter 114 is an arithmetic unit which calculates the difference between an output from the picture rearrangement unit 102 and predicted picture data from the motion compensation/prediction unit 112. A picture motion detection unit 115 is a processing unit which detects the picture motion based on the input signal 101. A target SN ratio setting unit 130 sets a target SN ratio serving as an index of the SN ratio in accordance with picture motion information and the like. The bitrate control unit 116 is a processing unit which determines the target bitrate of a GOP to be encoded, and the target code amount of each picture. The bitrate control unit 116 determines a target code amount in accordance with the target SN ratio set by the target SN ratio setting unit 130, the SN ratio calculated by the SN ratio calculation unit 113, and information from the buffer 107. A quantization control unit 117 is a processing unit which determines the quantization coefficient of a macroblock based on the target code amount of a picture determined by the bitrate control unit 116. The output terminal 118 outputs encoded data temporarily saved in the buffer 107.

The switch 103, DCT unit 104, quantization unit 105, inverse quantization unit 108, IDCT unit 109, adder 110, switch 111, motion compensation/prediction unit 112, SN ratio calculation unit 113, and subtracter 114 are included in the dotted line area 120.

The operation of each block in the dotted line area 120 of FIG. 1 will be explained with reference to FIG. 3.

In step S301, the picture type is determined. If the picture type is I-picture ("YES" in step S301), the process proceeds to step S302 to switch the switch 103 to the A side and turn off the switch 111. Then, the process proceeds to step S305.

If the picture type is B- or P-picture other than I-picture ("NO" in step S301), the process proceeds to step S303 to switch the switch 103 to the B side and turn on the switch 111. In step S304, the motion compensation/prediction unit 112 executes motion search to generate predicted picture data. The subtracter 114 calculates the difference between the predicted picture data and an input picture, generating a difference value signal.

In step S305, the DCT unit 104 executes orthogonal transform for each macroblock of an input signal. The quantization unit 105 quantizes an orthogonally transformed output coefficient using a quantization scale determined by the quantization control unit 117, generating encoded data. The quantization scale serving as a quantization parameter can be calculated by performing a process equivalent to STEP 2 of TM5, so a description thereof will be omitted.

In step S306, the inverse quantization unit 108 and IDCT unit 109 inverse-transform the quantized data generated in step S305, generating decoded data as a decoding result. For I-picture, a locally decoded picture can be obtained by this inverse-transform.

In step S307, the picture type is determined, similar to step S301. If the picture type is I-picture ("YES" in step S307), the process proceeds to step S310. If the picture type is B- or P-picture other than I-picture ("NO" in step S307), the process proceeds to step S308. In step S308, the adder 110 adds the predicted picture data obtained by subtraction by the subtracter 114, and the decoded data obtained by inverse-transform, generating the locally decoded picture of P- or B-picture.

In step S309, it is determined whether the picture type is P-picture. If the picture type is P-picture ("YES" in step S309), the process proceeds to step S310. If the picture type is B-picture ("NO" in step S309), the process proceeds to step S311.

In step S310, the generated locally decoded picture is stored in the motion compensation/prediction unit 112 so as to use it as a reference picture. In step S311, the SN ratio calculation unit 113 calculates the SN ratio of an input picture and locally decoded picture. The process proceeds to step S312 to determine whether all pictures have been encoded. If all pictures have been encoded ("YES" in step S312), the process ends. If a picture to be encoded still remains ("NO" in step S312), the process returns to step S301 and continues.

Referring back to FIG. 1, the operations of processing blocks other than those in the dotted line area 120 will be explained. The variable length coding unit 106 receives data output from the quantization unit 105, and performs variable length coding. The buffer 107 receives the data having undergone variable length coding, and outputs it from the output terminal 118. The buffer 107 outputs, to the bitrate control unit 116, information on the amount of generated code of an encoded picture and the quantization coefficient, and information on the SN ratio calculated by the SN ratio calculation unit 113.

The picture motion detection unit 115 generates picture motion information representing the number of pixels by which the encoding target picture contained in an input signal moves from an immediately preceding picture. The picture motion detection unit 115 receives an input signal, shake information from a gyrosensor (acceleration sensor) 119 which detects a shake of the encoding apparatus itself, and motion vector information from the motion compensation/prediction unit 112. The gyrosensor 119 detects the angular velocity when the encoding apparatus moves, and outputs it as shake information to the picture motion detection unit. When the encoding apparatus includes an image sensor (not shown), the moving amount of the entire frame of an input signal can be determined from shake information of the gyrosensor 119. When motion vector information is used, the average vector of motion vector information is calculated for each macroblock, and defined as the motion of the entire frame. From these pieces of information, the picture motion detection unit 115 generates picture motion information and outputs it to the target SN ratio setting unit 130.

Based on the received picture motion information, the target SN ratio setting unit 130 determines a target SN ratio considering the visual characteristic. The bitrate control unit 116 determines a target bitrate so that the average SN ratio of one GOP becomes equal to or higher than the target SN ratio considering the visual characteristic. Details of a process by the target SN ratio setting unit 130 and bitrate control unit 116 will be described with reference to the flowchart of FIG. 4. FIG. 4 is a flowchart showing an example of a process to determine a target bitrate by the target SN ratio setting unit 130 and bitrate control unit 116.

In step S401, an initial target SN ratio Tsnr is set, and picture motion information Move input from the picture motion detection unit 115 is set. The picture motion information Move is a value representing the number of pixels by which a picture moves from an immediately preceding one.

In step S402, it is determined whether the picture motion information Move is larger than a third threshold ThM1. If the picture motion information Move is larger than the third threshold ThM1 ("YES" in step S402), the process shifts to step S403. If the picture motion information Move is equal to or smaller than the third threshold ThM1 ("NO" in step S402), the process proceeds to step S404.

In step S403, a predetermined value N is added to the initial target SN ratio Tsnr to calculate a target SN ratio considering the visual characteristic. Then, the process proceeds to step S404. When the picture motion information Move is larger than the third threshold ThM1, the entire frame moves. Thus, a picture is formed from signals containing few high-frequency components. Even upon degradation of the picture quality, the SN ratio hardly greatly decreases. To the contrary, visually conspicuous noise such as block noise readily occurs. To prevent such noise, the first embodiment increases the target SN ratio.

For example, the third threshold ThM1 can be set to "32 pixels". In this case, when picture motion information is "40 pixels", and the picture moves by more than the third threshold ThM1 "32 pixels", the initial target SN ratio Tsnr may also be corrected. Since the SN ratio does not decrease even upon degradation of the picture quality owing to the moving amount, the predetermined value N added to the initial target SN ratio is set to N=Move/ThM1 (dB).

In step S404, an average SN ratio Asnr of one GOP is calculated. The average SN ratio Asnr can be calculated as, for example, the average of SN ratios of one GOP calculated by the SN ratio calculation unit 113. The average SN ratio Asnr of one GOP can also be predicted from the average of SN ratios calculated by the SN ratio calculation unit 113 for each picture type. The method of calculating the average SN ratio is not an essential feature of the present invention, and the calculation method is not limited to these two methods. Another method of calculating the average SN ratio of one GOP is also available.

In step S405, the target SN ratio Tsnr and average SN ratio Asnr are compared with each other. If the average SN ratio Asnr is higher than the target SN ratio Tsnr ("YES" in step S405), the process proceeds to step S406. If the average SN ratio Asnr is equal to or lower than the target SN ratio Tsnr ("NO" in step S405), the process proceeds to step S408.

In step S406, it is further determined whether the average SN ratio Asnr exceeds the target SN ratio Tsnr by a first threshold Th1. If the average SN ratio Asnr exceeds the target SN ratio Tsnr by the first threshold Th1 ("YES" in step S406), the process proceeds to step S407. If the average SN ratio Asnr does not exceed the target SN ratio Tsnr by the first threshold Th1 ("NO" in step S406), the process ends.

In step S407, (Asnr−Tsnr)×α is subtracted from a current rate Rate to calculate a new rate Rate⁻. Then, the process ends. α is an arbitrary coefficient calculated from the average bitrate of the variable bitrate VBR. If the average SN ratio Asnr greatly exceeds the target SN ratio Tsnr, the code amount is excessively large. Even if the rate is decreased, the average SN ratio Asnr still exceeds the target SN ratio. In step S407, therefore, the rate is decreased.

For example, numerical values are Asnr=45.0 dB, Tsnr=40.0 dB, Th1=2, Rate=7000000 bps, and α=200000. In this case, the average SN ratio Asnr exceeds the target SN ratio Tsnr by 5 dB, and this value is larger than the first threshold Th1. Hence, the rate is decreased by the above-described calculation to set the new rate Rate⁻ to 6000000 bps.

Processes in step S408 and subsequent steps will be explained. In step S408, it is determined whether the target SN ratio Tsnr exceeds the average SN ratio Asnr by a second threshold Th2. If the target SN ratio Tsnr exceeds the average SN ratio Asnr by the second threshold Th2 ("YES" in step S408), the process proceeds to step S409. If the target SN ratio Tsnr does not exceed the average SN ratio Asnr by the second threshold Th2 ("NO" in step S408), the process ends.

In step S409, (Tsnr−Asnr)×β is added to the current rate Rate to calculate the new rate Rate$^+$. Then, the process ends. β is an arbitrary coefficient calculated from the average bitrate of the variable bitrate VBR. If the target SN ratio Tsnr greatly exceeds the average SN ratio Asnr, the code amount is excessively small, and the average SN ratio cannot exceed the target SN ratio unless the rate is increased. In step S409, therefore, the rate is increased.

For example, numerical values are Asnr=35.0 dB, Tsnr=40.0 dB, Th1=2, Rate=7000000 bps, and β=200000. In this case, the target SN ratio Tsnr exceeds the average SN ratio Asnr by 5 dB, and this value is larger than the second threshold Th2. Thus, the rate is increased by the above-described calculation to set the new rate Rate$^+$ to 8000000 bps.

As a result, the bitrate can be calculated to calculate a target code amount from it in STEP 1 of TM5 described above. The target code amount is input to the quantization control unit 117, and STEP 2 and STEP 3 of TM5 are executed to control the quantization unit 105.

The above-described rate calculation equations are merely examples, and the rate increasing and decreasing methods are not limited to these equations. The rate can also be controlled by another equation using the average SN ratio Asnr, target SN ratio, or picture motion information Move. The picture motion detection unit 115 uses pieces of information from the gyrosensor 119 and motion compensation/prediction unit 112. However, the picture motion detection unit 115 may also use information from either of the gyrosensor 119 and motion compensation/prediction unit 112, or other information.

By this process, even in a situation where the SN ratio hardly greatly decreases but noise readily occurs in high-speed panning or the like, a target code amount considering the visual characteristic can be set, improving picture quality.

[Second Embodiment]

Figure 5:
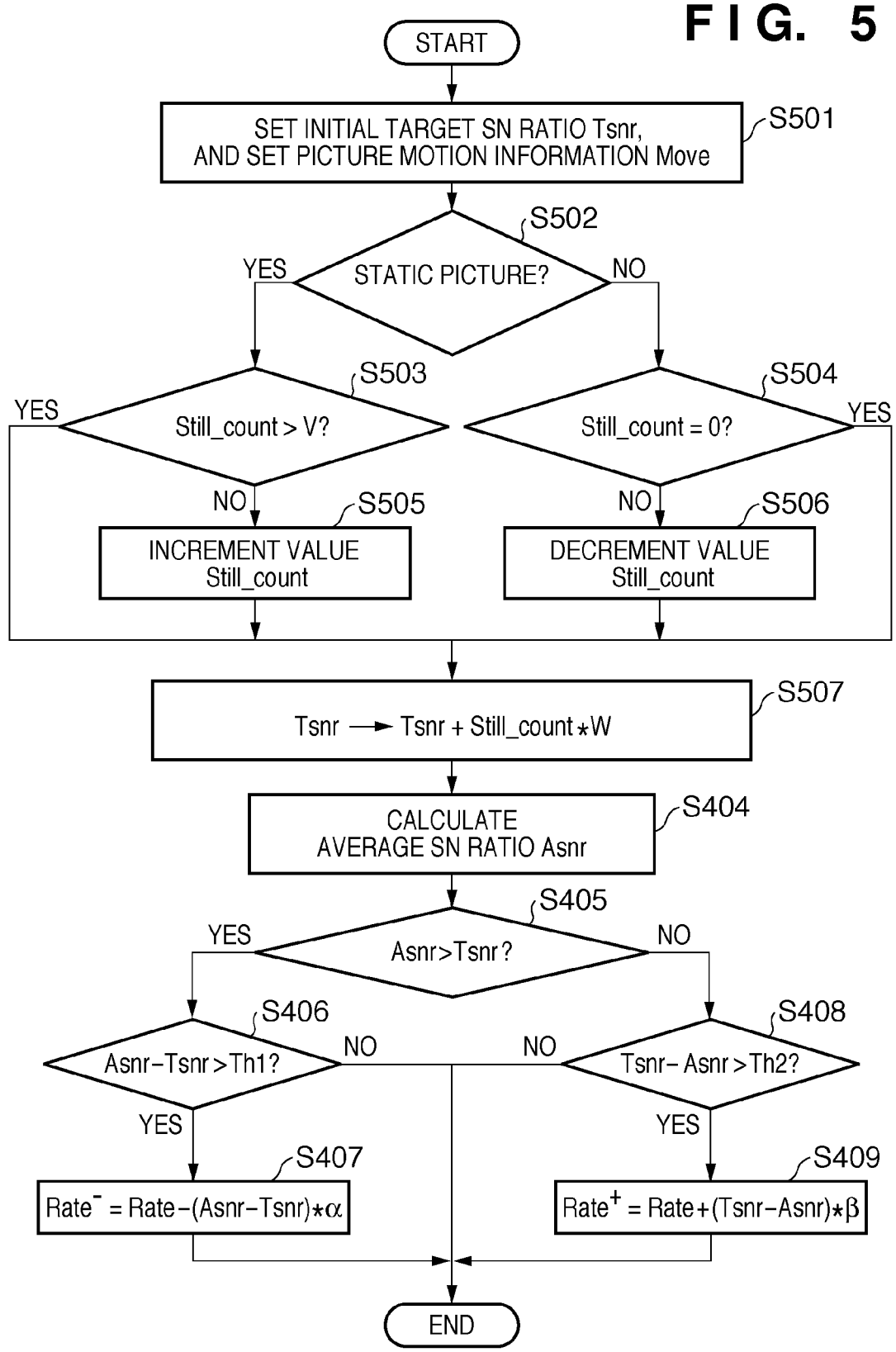
FIG. 5 is a flowchart showing an example of a process to determine a target bitrate according to the second embodiment of the present invention.

The second embodiment of the present invention will be described with reference to FIG. 5. An encoding apparatus according to the second embodiment has the same arrangement as that shown in FIG. 1. The process in a dotted line area 120 is also the same as the flowchart shown in FIG. 3 except that a process by a bitrate control unit 116 complies with a flowchart shown in FIG. 5. Details of the process by the bitrate control unit 116 according to the second embodiment will be explained with reference to FIG. 5.

In step S501, the initial target SN ratio Tsnr is set, and picture motion information Move input from a picture motion detection unit 115 is set.

In step S502, it is determined based on the picture motion information Move whether the target picture is a picture (dynamic picture) with a large motion between pictures, or a picture (static picture) with a small motion. In this determination, for example, the value of the picture motion information Move is compared with a predetermined fourth threshold ThM2. If the value of the picture motion information Move is larger than the fourth threshold ThM2, it is determined that the target picture is a dynamic picture. If the value of the picture motion information Move is equal to or smaller than the fourth threshold ThM2, it is determined that the target picture is a static picture.

If it is determined that the target picture is a static picture ("YES" in step S502), the process proceeds to step S503. If it is determined that the target picture is a dynamic picture ("NO" in step S502), the process proceeds to step S504. In step S503, it is determined whether a value Still_count representing the number of pictures determined to be static pictures is larger than a predetermined threshold V. The value Still_count is initialized to "0" at the start of encoding a target moving image. Every time the target picture is determined to be a static one, the value Still_count is incremented by one and held as a coefficient value.

If the value Still_count is larger than the threshold V ("YES" in step S503), the process proceeds to step S507. If the value Still_count is equal to or smaller than the threshold V ("NO" in step S503), the process proceeds to step S505. In step S505, the value Still_count is incremented by one and updated in the positive direction. After that, the process proceeds to step S507.

If it is determined that the target picture is a dynamic picture and the process shifts to step S504, it is determined in step S504 whether the value Still_count is 0. If the value Still_count is 0 ("YES" in step S504), the process shifts to step S507. If the value Still_count is not 0 ("NO" in step S504), the process proceeds to step S506, and the value Still_count is decremented by one and updated in the negative direction. Then, the process proceeds to step S507.

In step S507, in order to set the initial target SN ratio Tsnr to a target SN ratio considering the visual characteristic, the value Still_count×W is added to the initial target SN ratio Tsnr to adjust the target SN ratio Tsnr.

When it is determined that the picture to be encoded is a static or nearly static picture, noise stands out even at the same SN ratio as that of other pictures because the picture does not move and is repetitively viewed. This can be prevented by increasing the target SN ratio in step S507.

However, if the target SN ratio is increased to a desired value at once, the picture quality improves suddenly and feels unnatural. To prevent unnatural improvement of picture quality, the second embodiment increases the value Still_count stepwise. For example, letting the threshold V=9 and W=0.4, the value Still_count takes a value ranging from 0 to 10. Tsnr can be increased stepwise every 0.4 dB up to 4 dB at maximum.

Processes after step S507 are the same as those after step S404 of FIG. 4 in the first embodiment, and are denoted by the same reference numerals. Hence, the second embodiment does not repeat a description of the same processes.

As described above, even when noise stands out in a static or nearly static picture, the second embodiment can set a target code amount considering the visual characteristic, improving the picture quality.

The above-described rate calculation equations are merely examples, and the rate increasing and decreasing methods are not limited to these equations. The rate can also be controlled by another equation using the average SN ratio Asnr, target SN ratio, or picture motion information Move. The picture motion detection unit 115 uses pieces of information from a gyrosensor 119 and motion compensation/prediction unit 112. However, the picture motion detection unit 115 may also use information from either of the gyrosensor 119 and motion compensation/prediction unit 112, or other information.

[Third Embodiment]

Figure 6:
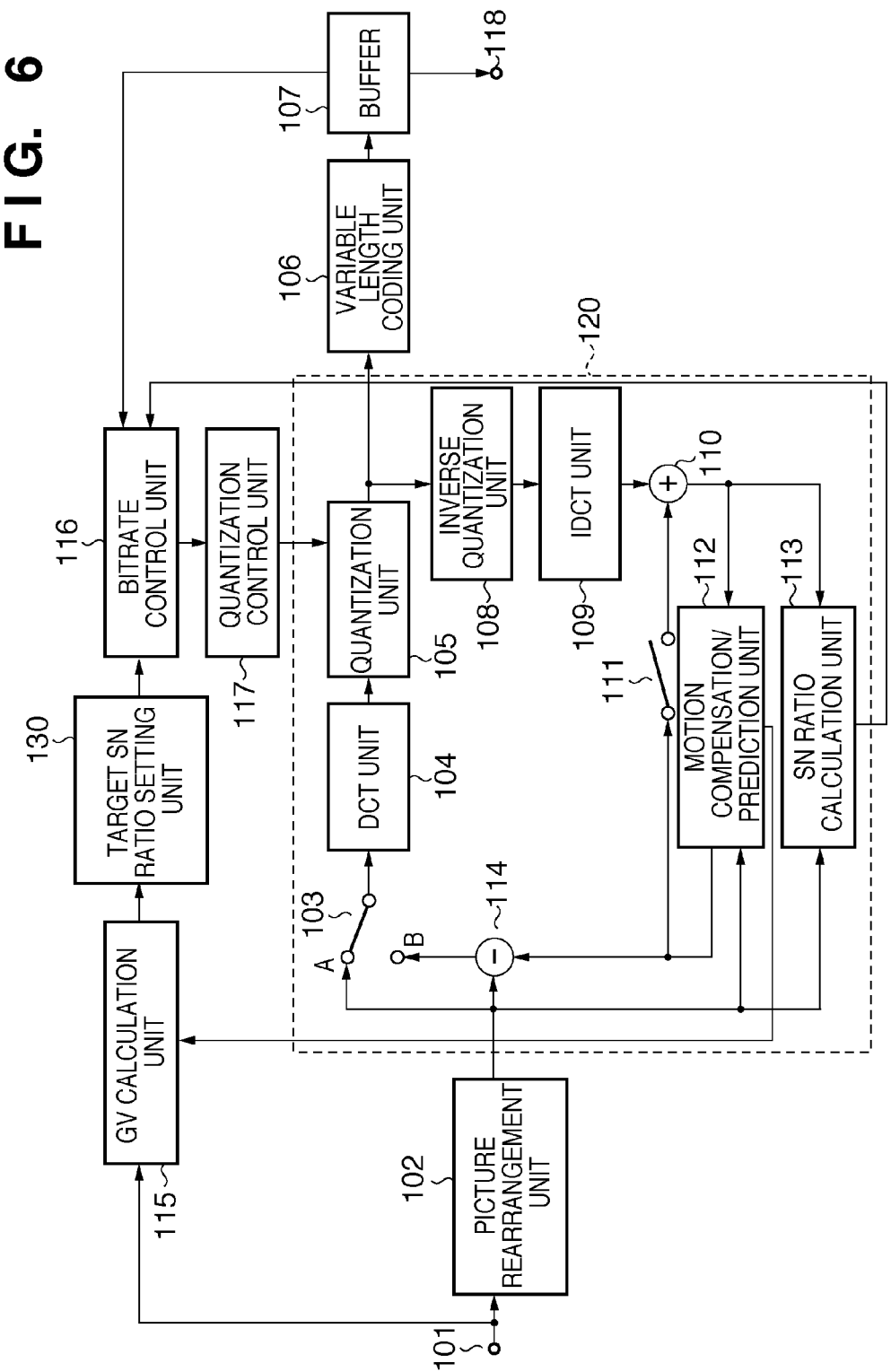
FIG. 6 is a block diagram showing an example of the arrangement of an encoding apparatus which implements an encoding method according to the third embodiment of the present invention.
Figure 7:
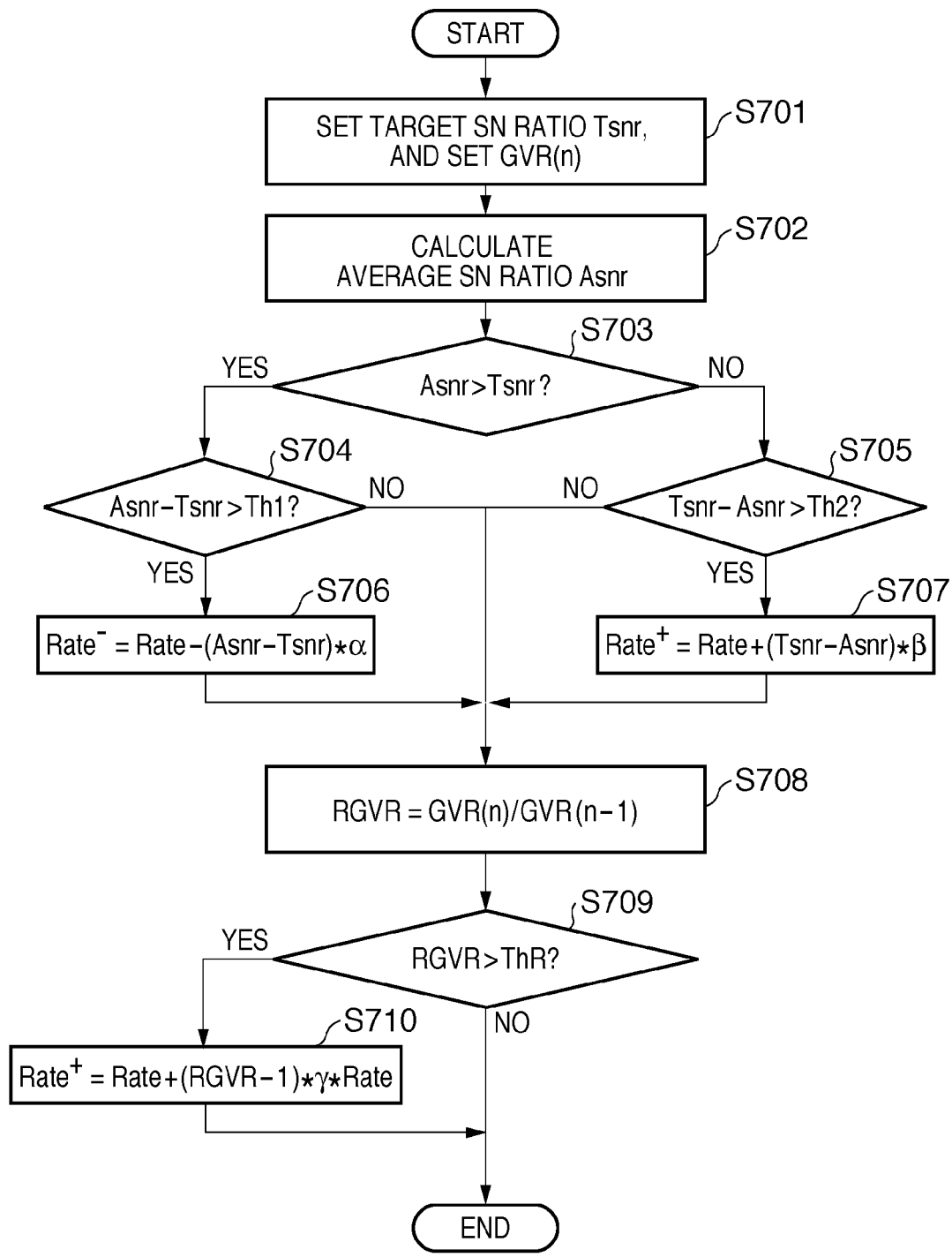
FIG. 7 is a flowchart showing an example of a bitrate control process according to the third embodiment of the present invention.

The third embodiment of the present invention will be described with reference to FIGS. 6 and 7. An encoding apparatus according to the third embodiment has an arrangement shown in FIG. 6. The arrangement of the encoding apparatus according to the third embodiment is almost the same as that shown in FIG. 1, and the process in a dotted line area 120 is also the same as the flowchart shown in FIG. 3. However, the encoding apparatus according to the third embodiment is different from the arrangement in FIG. 1 in that it comprises a global vector calculation unit 601 instead of the picture motion detection unit 115 and gyrosensor 119.

The global vector calculation unit 601 is a processing unit which calculates a global vector based on an input signal 101. The global vector calculation unit 601 calculates a global vector reliable value GRV (Global vector Reliable Value), and outputs it to a target SN ratio setting unit 130. An outline of a method of calculating the global vector reliable value GRV by the global vector calculation unit 601 will be described.

The global vector represents the spatial position difference (i.e., the shift amount between pictures) (i,j) between pictures (a picture to be encoded and an immediately preceding picture) input in the display order in playback of a moving image. That is, the global vector is a parameter representing the global motion between pictures or wide areas (e.g., slices) each smaller than a picture. To estimate a global vector having a maximum correlation, evaluation functions such as MSE (Mean Square Error) (equation 1) or MAE (Mean Absolute Error) (equation 2) are employed. MAD (Mean Absolute Difference) is also available.

$$MSE(i, j) = \frac{1}{QR}\sum_{q=0}^{Q}\sum_{r=0}^{R}[S_{cur}(m+i, n+j) - S_{ref}(m, n)]^2 \quad (1)$$

$$GRV = \min MSE(i, j) \quad (-M \leq i \leq M, -N \leq j \leq N)$$

$$MAE(i, j) = \frac{1}{QR}\sum_{q=0}^{Q}\sum_{r=0}^{R}|S_{cur}(m+1, n+j) - S_{ref}(m, n)| \quad (2)$$

$$GRV = \min MAE(i, j) \quad (-M \leq i \leq M, -N \leq j \leq N)$$

where $S_{cur}(m,n)$ is the (m,n)th pixel value in a current picture, $S_{ref}(m,n)$ is the (m,n)th pixel value in a reference picture, and (i,j) is the spatial position of the current picture with respect to the reference picture. In the third embodiment, the reference picture is a picture immediately preceding to the current picture.

Letting M and N be the numbers of horizontal and vertical pixels, m=k×q and n=l×r, where m, k, n, and l are natural numbers satisfying 0≤m≤M, 1≤k≤M, 0≤n≤N, and 1≤l≤N. Q and R satisfy M-k≤Q≤M, and N-l≤R≤N.

The evaluation function is based on the difference between pixel values, and a vector which minimizes the MAE value or MSE value is determined as the global vector. For example, as for the MAE value, the reference picture is shifted by one pixel in a predetermined direction, and the average of the sum of MAE values is calculated every pixel moving distance. A moving distance when the average MAE value becomes minimum is defined as the global vector selection criterion. This process is also executed in, for example, a direction perpendicular to the predetermined direction. If a moving distance at which the average MAE value becomes minimum is obtained in this direction, the global vector can be determined from the two moving distances and moving directions.

A minimum MAE value or MSE value obtained at this time is defined as the global vector reliable value GRV.

In this manner, the global vector calculation unit 601 calculates the global vector reliable value GRV representing the correlation between pictures, and outputs it to the target SN ratio setting unit 130.

The target SN ratio setting unit 130 determines a target SN ratio considering the correlation between frames in accordance with the received global vector reliable value GRV. The bitrate control unit 116 determines a target bitrate so that the average SN ratio of one GOP becomes equal to or higher than the target SN ratio.

More specifically, the bitrate control unit 116 decides a target bitrate based on pieces of input information so as not to generate noise. Details of a process by the target SN ratio setting unit 130 and bitrate control unit 116 will be described with reference to the flowchart of FIG. 7. FIG. 7 is a flowchart showing an example of a process to determine the target bitrate by the target SN ratio setting unit 130 and bitrate control unit 116.

In step S701, the target SN ratio Tsnr is set, and global vector reliable value GRV(n) input from the global vector calculation unit 601 is set. "n" represents an arbitrary number representing a picture number, and is set to a value corresponding the picture number of the current picture to be processed.

In step S702, the average SN ratio Asnr of one GOP is calculated. The average SN ratio Asnr can be calculated as, for example, the average of SN ratios of one GOP calculated by an SN ratio calculation unit 113. The average SN ratio Asnr of one GOP can also be predicted from the average of SN ratios calculated by the SN ratio calculation unit 113 for each picture type. The method of calculating the average SN ratio is not an essential feature of the present invention, and the calculation method is not limited to these two methods. Another method of calculating the average SN ratio of one GOP is also available.

In step S703, the target SN ratio Tsnr and average SN ratio Asnr are compared with each other. If the average SN ratio Asnr is higher than the target SN ratio Tsnr ("YES" in step S703), the process proceeds to step S704. If the average SN ratio Asnr is equal to or lower than the target SN ratio Tsnr ("NO" in step S703), the process proceeds to step S705.

In step S704, it is further determined whether the average SN ratio Asnr exceeds the target SN ratio Tsnr by the first threshold Th1. If the average SN ratio Asnr exceeds the target SN ratio Tsnr by the first threshold Th1 ("YES" in step S704), the process proceeds to step S706. If the average SN ratio Asnr does not exceed the target SN ratio Tsnr by the first threshold Th1 ("NO" in step S704), the process proceeds to step S708.

In step S706, (Asnr−Tsnr)×α is subtracted from the current rate Rate to calculate the new rate Rate⁻. Then, the process proceeds to step S708. α is an arbitrary coefficient calculated from the average bitrate of the variable bitrate VBR. If the average SN ratio Asnr greatly exceeds the target SN ratio Tsnr, the code amount is excessively large. Even if the rate is decreased, the average SN ratio Asnr still exceeds the target SN ratio. In step S706, therefore, the rate is decreased.

For example, numerical values are Asnr=45.0 dB, Tsnr=40.0 dB, Th1=2, Rate=7000000 bps, and α=200000. In this case, the average SN ratio Asnr exceeds the target SN ratio Tsnr by 5 dB, and this value is larger than the first threshold Th1. Hence, the rate is decreased by the above-described calculation to set the new rate Rate⁻ to 6000000 bps.

Processes in step S705 and subsequent steps will be explained. In step S705, it is determined whether the target SN ratio Tsnr exceeds the average SN ratio Asnr by the second threshold Th2. If the target SN ratio Tsnr exceeds the average SN ratio Asnr by the second threshold Th2 ("YES" in step S705), the process proceeds to step S707. If the target SN ratio Tsnr does not exceed the average SN ratio Asnr by the second threshold Th2 ("NO" in step S705), the process proceeds to step S708.

In step S707, $(Tsnr-Asnr) \times \beta$ is added to the current rate Rate to calculate the new rate Rate$^+$. Then, the process proceeds to step S708. $\beta$ is an arbitrary coefficient calculated from the average bitrate of the variable bitrate VBR. If the target SN ratio Tsnr greatly exceeds the average SN ratio Asnr, the code amount is excessively small, and the average SN ratio cannot exceed the target SN ratio unless the rate is increased. In step S707, therefore, the rate is increased.

For example, numerical values are Asnr=35.0 dB, Tsnr=40.0 dB, Th1=2, Rate=7000000 bps, and $\beta$=200000. In this case, the target SN ratio Tsnr exceeds the average SN ratio Asnr by 5 dB, and this value is larger than the second threshold Th2. Thus, the rate is increased by the above-described calculation to set the new rate Rate$^+$ to 8000000 bps.

In step S708, a change ratio RGRV (Ratio GRV) is calculated from the global vector reliable value GRV(n) of the current picture to be processed and the global vector reliable value GRV(n−1) of the immediately preceding picture. The change ratio RGRV can be calculated from RGRV=GRV(n)/GRV(n−1).

In step S709, it is determined whether the change ratio RGRV is higher than a fifth threshold ThR. If the change ratio RGRV is higher than the fifth threshold ThR ("YES" in step S709), the process proceeds to step S710. If the change ratio RGRV is equal to or lower than the fifth threshold ThR ("NO" in step S709), the process ends.

In step S710, (RGRV−1)*γ*Rate is added to the current rate Rate to calculate a new higher rate Rate$^+$. Then, the process ends. The fifth threshold ThR is equal to or larger than 1, and γ is an arbitrary coefficient calculated from the average bitrate.

When the change ratio RGRV is higher than the fifth threshold ThR, the correlation between frames is low. The global vector reliable value represents the correlation between frames. A reliable value larger than that of a preceding picture, that is, the change ratio RGRV≥1 means that the correlation between frames decreases and the difference between them increases. The picture quality degrades unless the code amount is increased. For this reason, the code amount needs to be increased in accordance with the change ratio.

For example, when numerical values are ThR=1.1, γ=1, Rate=6000000 bps, and RGVR=1.2, the new rate is 7200000 bps.

As a result, the bitrate can be calculated to calculate a target code amount from it in STEP 1 of TM5 described above. The target code amount is input to a quantization control unit 117, and STEP 2 and STEP 3 of TM5 are executed to control a quantization unit 105.

The above-described rate calculation equations are merely examples, and the rate increasing and decreasing methods are not limited to these equations. Both the SN ratio and global vector reliable value are adopted in the above description, but only either of them may also be used. The rate can also be controlled by another equation using the average SN ratio Asnr, the target SN ratio, or the global vector reliable value GRV and change ratio RGRV.

By this process, even when a large change occurs between pictures or a picture with low SN ratio exists, this state can be detected before encoding to adjust the target code amount and improve the picture quality of the encoding result. By adjusting the target code amount, a precise encoding process can be achieved even for a picture in which high-frequency components greatly increase upon the stop of a camera from a picture containing few high-frequency components in panning or the like, or a picture in which an object suddenly appears in the frame.

[Other Embodiments]

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-287852, filed Nov. 5, 2007, and No. 2007-287853, filed Nov. 5, 2007, which are hereby incorporated by reference herein in their entirety.

What is claimed is:

1. An image encoding apparatus which encodes picture data, the apparatus comprising:
 an encoding unit configured to encode a picture to be encoded by orthogonally transforming and quantizing the picture;
 a decoding unit configured to decode an encoded picture by inverse-quantizing and inverse-orthogonally transforming the encoded picture;
 a signal-to noise (SN) ratio calculation unit configured to calculate an SN ratio using both of picture data not yet processed by said encoding unit and picture data processed by said decoding unit;
 a setting unit configured to set a target SN ratio serving as an index of the SN ratio;
 a control unit configured to control a quality of the picture encoded by said encoding unit based on a difference between the SN ratio calculated by said SN ratio calculation unit and the target SN ratio set by said setting unit; and a motion detection unit configured to detect motion information between the picture to be encoded and another picture, wherein said control unit determines whether the picture to be encoded is a static picture and when pictures to be encoded are predetermined number of continuous static pictures, said control unit controls the quality of the encoded picture to be improved stepwise for every picture, said control unit includes a determination unit which determines the picture to be encoded as the static picture when an amount of motion indicated by the motion information is not more than a predetermined value, and said control unit controls the target SN ratio set by said setting unit to adjust the target SN ratio based on a count value representing the number of static pictures determined by said determination unit.

2. The apparatus according to claim 1, wherein
when the calculated SN ratio is higher than the target SN ratio, said control unit compares the difference between the calculated SN ratio and the target SN ratio with a first threshold, and when the difference is larger than the first threshold, decreases a bitrate of the picture to be encoded by said encoding unit, and when the calculated SN ratio is not higher than the target SN ratio, said control unit compares the difference between the target SN ratio and the calculated SN ratio with a second threshold, and when the difference is larger than the second threshold, increases the bitrate of the picture to be encoded by said encoding unit.

3. The apparatus according to claim 1, wherein
when said determination unit determines that the picture to be encoded is a static picture, said control unit updates the count value in a positive direction, when said determination unit determines that the picture to be encoded is not a static picture, said control unit updates the count value in a negative direction, and said control unit adjusts the target SN ratio based on the updated count value.

4. The apparatus according to claim 1, further comprising at least one of:
a motion compensation/prediction unit configured to detect a motion vector between the picture to be encoded and a reference picture; and a shake detection unit configured to detect a shake of the image encoding apparatus itself and generate shake information, wherein said motion detection unit detects the motion information based on at least one of the motion vector and the shake information.

5. An image encoding apparatus which encodes picture data, the apparatus comprising:
an encoding unit configured to encode a picture to be encoded by orthogonally transforming and quantizing the picture;

a decoding unit configured to decode an encoded picture by inverse-quantizing and inverse-orthogonally transforming the encoded picture;

a signal-to-noise (SN) ratio calculation unit configured to calculate an SN ratio using both of picture data not yet processed by said encoding unit and picture data processed by said decoding unit;

a setting unit configured to set a target SN ratio serving as an index of the SN ratio;

a control unit configured to control a quality of the picture to be encoded by said encoding unit based on a difference between the SN ratio calculated by said SN ratio calculation unit and the target SN ratio set by said setting unit; and a global vector calculation unit configured to calculate a global vector serving as a motion vector between the picture to be encoded and the picture immediately preceding to the picture to be encoded, wherein said control unit determines a change in correlation between pictures based on the global vector calculated for the picture to be encoded and the global vector calculated for the intermediately preceding picture, and when the correlation decreases in association with the picture to be encoded, the control unit controls the quality of the encoded picture to be improved, and said control unit compares a value representing the correlation with a predetermined threshold, and when the value representing the correlation is higher than the predetermined threshold, increases a bitrate of the picture to be encoded by said encoding unit.

6. The apparatus according to claim 5, wherein
when the calculated SN ratio is higher than the target SN ratio, said control unit compares the difference between the calculated SN ratio and the target SN ratio with a first threshold, and when the difference is larger than the first threshold, decreases a bitrate of the picture to be encoded by said encoding unit, and when the calculated SN ratio is not higher than the target SN ratio, said control unit compares the difference between the target SN ratio and the calculated SN ratio with a second threshold, and when the difference is larger than the second threshold, increases the bitrate of the picture to be encoded by said encoding unit.

7. A method for encoding picture data by an image encoding apparatus, the method comprising steps, which said image encoding apparatus executes, of:
encoding a picture to be encoded by orthogonally transforming and quantizing the picture;

decoding an encoded picture by inverse-quantizing and inverse-orthogonally transforming the encoded picture;

calculating a signal-to-noise (SN) ratio using both of picture data not yet processed in said encoding step and picture data processed in said decoding step;

setting a target SN ratio serving as an index of the SN ratio;

detecting motion information between the picture to be encoded and another picture; and controlling a quality of the picture encoded in said encoding based on a difference between the SN ratio calculated by said SN ratio calculation unit and the target SN ratio set in said setting, wherein it is determined whether the picture to be encoded is a static picture, and when pictures to be encoded are predetermined number of continuous static pictures, the quality of the picture encoded to be improved stepwise for every picture in said controlling, wherein the picture is determined to be encoded as the static picture when an amount of motion indicated by the motion information is not more than a predetermined value, and the controlling controls the target SN ratio set in the setting step to adjust the target SN ratio based on the count value representing the number of determined static pictures.

8. A method for encoding picture data by an image encoding apparatus, the method comprising steps, which said image encoding apparatus executes, of:

encoding a picture to be encoded by orthogonally transforming and quantizing the picture;

decoding an encoded picture by inverse-quantizing and inverse-orthogonally transforming the encoded picture;

calculating a signal-to-noise (SN) ratio using both of picture data not yet processed in said encoding step and picture data processed in said decoding step;

setting a target SN ratio serving as an index of the SN ratio;

calculating a global vector serving as a motion vector between the picture to be encoded and the picture immediately preceding to the picture to be encoded; and controlling a quality of the picture encoded in said encoding on the basis of a difference between the calculated SN ratio and the set target SN ratio, wherein it is determined a change in correlation between pictures based on the global vector calculated for the picture to be encoded and the global vector calculated for the immediately preceding picture and when the correlation decreases in association with the picture to be encoded, the controlling step controls the quality of the encoded picture to be improved;

the controlling step compares a value representing the correlation with a predetermined threshold, and when the value representing the correlation is higher than the predetermined threshold, increases a bitrate of the picture to be encoded by the encoding step.

9. A non-transitory computer-readable storage medium storing a computer program for causing a computer to execute a method of controlling an image encoding apparatus which encodes picture data, the method comprising:

encoding a picture to be encoded by orthogonally transforming and quantizing the picture;

decoding an encoded picture by inverse-quantizing and inverse-orthogonally transforming the encoded picture;

calculating a signal-to-noise (SN) ratio using both of picture data not yet processed in said encoding step and picture data processed in said decoding step;

setting a target SN ratio serving as an index of the SN ratio;

detecting motion information between the picture to be encoded and another picture; and controlling a quality of the picture encoded in said encoding based on a difference between the SN ratio calculated by said SN ratio calculation unit and the target SN ratio set in said setting, wherein it is determined whether the picture to be encoded is a static picture, and when pictures to be encoded are predetermined number of continuous static pictures, the quality of the picture encoded to be improved stepwise for every picture in said controlling;

wherein the picture is determined to be encoded as the static picture when an amount of motion indicated by the motion information is not more than a predetermined value, and the controlling step controls the target SN ratio set in the setting step to adjust the target SN ratio based on the count value representing the number of determined static pictures.

10. A non-transitory computer-readable storage medium storing a computer program for causing a computer to execute a method of controlling an image encoding apparatus which encodes picture data, the method comprising:

encoding a picture to be encoded by orthogonally transforming and quantizing the picture;

decoding an encoded picture by inverse-quantizing and inverse-orthogonally transforming the encoded picture;

calculating a signal-to-noise (SN) ratio using both of picture data not yet processed by said encoding unit and picture data processed by said decoding unit;

setting a target SN ratio serving as an index of the SN ratio;

calculating a global vector serving as a motion vector between the picture to be encoded and the picture immediately preceding to the picture to be encoded; and controlling a quality of the picture encoded in said encoding on the basis of a difference between the calculated SN ratio and the set target SN ratio, wherein it is determined a change in correlation between pictures based on the global vector calculated for the picture to be encoded and the global vector calculated for the immediately preceding picture and when the correlation decreases in association with the picture to be encoded, said controlling step controls the quality of the encoded picture to be improved;

the controlling step compares a value representing the correlation with a predetermined threshold, and when the value representing the correlation is higher than the predetermined threshold, increases a bitrate of the picture to be encoded by the encoding step.

* * * * *